US011755490B2

(12) United States Patent
Cariello et al.

(10) Patent No.: US 11,755,490 B2
(45) Date of Patent: Sep. 12, 2023

(54) UNMAP OPERATION TECHNIQUES

(71) Applicant: Micron Technology, Inc., Boise, ID (US)

(72) Inventors: Giuseppe Cariello, Boise, ID (US); Luca Porzio, Casalnuovo (IT); Roberto Izzi, Caserta (IT); Jonathan S. Parry, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/122,174

(22) Filed: Dec. 15, 2020

(65) Prior Publication Data

US 2022/0188237 A1 Jun. 16, 2022

(51) Int. Cl.
*G06F 12/0873* (2016.01)
*G06F 12/0891* (2016.01)
*G06F 12/06* (2006.01)
*G06F 12/02* (2006.01)

(52) U.S. Cl.
CPC ...... *G06F 12/0873* (2013.01); *G06F 12/0246* (2013.01); *G06F 12/0646* (2013.01); *G06F 12/0891* (2013.01); *G06F 2212/7201* (2013.01)

(58) Field of Classification Search
CPC ............. G06F 12/0873; G06F 12/0246; G06F 12/0646; G06F 12/0891; G06F 2212/7201
See application file for complete search history.

(56) References Cited

U.S. PATENT DOCUMENTS

| 6,324,600 | B1 * | 11/2001 | Brice | G06F 13/387 |
| | | | | 712/7 |
| 11,157,199 | B1 * | 10/2021 | Nguyen | G06F 9/45533 |
| 2002/0048277 | A1 * | 4/2002 | Bennett | H04L 49/9052 |
| | | | | 370/415 |
| 2016/0315881 | A1 * | 10/2016 | Pierson | H04L 49/35 |
| 2018/0024779 | A1 * | 1/2018 | Kojima | G06F 12/109 |
| | | | | 711/103 |
| 2020/0019338 | A1 * | 1/2020 | Park | G06F 3/0608 |
| 2020/0192792 | A1 * | 6/2020 | Cho | G06F 12/0246 |
| 2020/0218470 | A1 * | 7/2020 | Cho | G06F 3/0659 |
| 2021/0096983 | A1 * | 4/2021 | Pu | G06F 3/0652 |

* cited by examiner

*Primary Examiner* — Prasith Thammavong
(74) *Attorney, Agent, or Firm* — Holland & Hart LLP

(57) ABSTRACT

Methods, systems, and devices for unmap operation techniques are described. A memory system may include a volatile memory device and a non-volatile memory device. The memory system may receive a set of unmap commands that each include a logical block address associated with unused data. The memory system may determine whether one or more parameters associated with the set of unmap commands satisfy a threshold. If the one or more parameters satisfy the threshold, the memory system may select a first procedure for performing the set of unmap commands different from a second procedure (e.g., a default procedure) for performing the set of unmap commands and may perform the set of unmap commands using the first procedure. If the one or more parameters do not satisfy the threshold, the memory system may perform the set of unmap commands using the second procedure.

25 Claims, 5 Drawing Sheets

UNMAP OPERATION TECHNIQUES

FIELD OF TECHNOLOGY

The following relates generally to one or more systems for memory and more specifically to unmap operation techniques.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
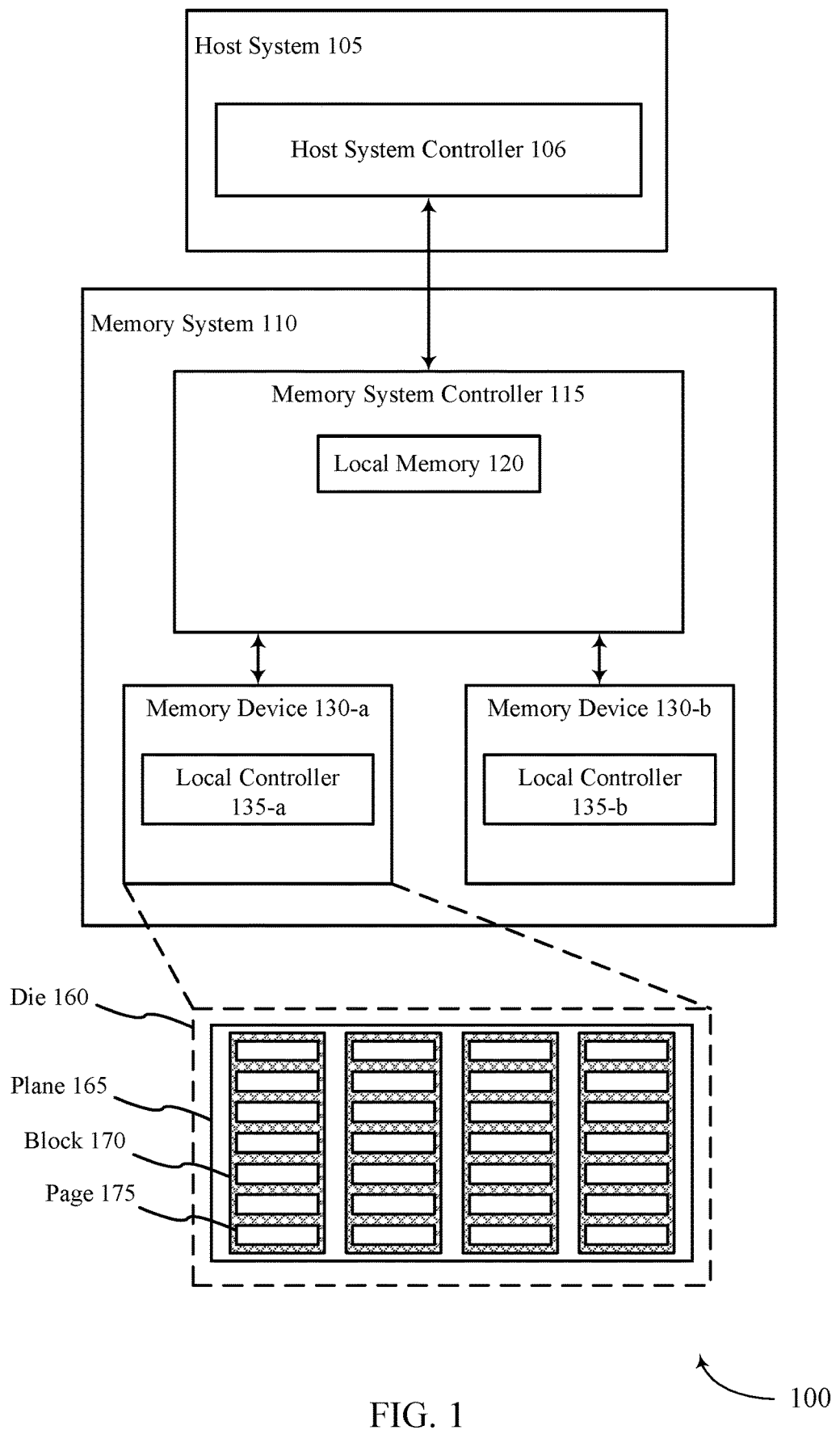
FIG. 1 illustrates an example of a system that supports unmap operation techniques in accordance with examples as disclosed herein.

Memory devices of a memory system may store data at a corresponding physical address, where a physical address may identify the physical location of a corresponding memory cell within the memory device. The physical location of data within a memory device may change over time due to the memory device accommodating the writing of additional data, maintenance operations performed by the memory device (e.g., garbage collection operations), or for any number of other reasons. A host system coupled with the memory system may reference data (e.g., if issuing read, write, or other commands associated with the data) using logical addresses (e.g., logical block addresses (LBAs), virtual addresses, system addresses, or other logical addresses), and the memory device may generate and maintain a mapping between the logical addresses associated with the data and the physical addresses of the memory cells at which the data is stored, which may support the memory device changing the physical addresses over time.

The host system may use an unmap command to free storage space of a memory device that is allocated to or used to store unused data. For example, the host system may issue (e.g., transmit) an unmap command to the memory system that includes an LBA associated with the unused data. The memory system, in response to receiving the unmap command, may update a mapping between the LBA and a physical address of the unused data to indicate that the LBA is disassociated from the physical address. Additionally, the memory system may update a second mapping to indicate that the data stored at the physical address is invalid (e.g., unused). In some cases, the host system may issue a large quantity of unmap commands to the memory system over a relatively short duration of time. To perform the quantity of unmap commands, the memory system may load and unload corresponding mappings to a volatile memory device of the memory system to update the mappings. Some procedures for performing unmap commands may increase latency and power consumption of the memory system due to loading and unloading these mappings (e.g., in some cases the loading and unloading may be unnecessary). Thus, techniques to improve procedures for performing unmap commands may be desired.

Techniques, systems, and devices are described herein for increasing unmap command performance by using a boost procedure. For example, a host system may issue, to a memory system coupled with the host system, a set of unmap commands that each include an LBA associated with unused data. The memory system may determine that one or more parameters associated with the set of unmap commands (e.g., a queue depth, a pattern of data, a progressive order of the LBAs, a quantity of unmap commands, or some other parameter) satisfy one or more thresholds. The memory system may select a procedure for performing the set of unmap commands based on the one or more parameters satisfying the one or more thresholds. For example, if the one or more parameters satisfy an associated threshold, the memory system may select a boost procedure for performing the set of unmap commands and may perform the set of unmap commands using the boost procedure. In some cases, the boost procedure may include processes to group changes to some tables (e.g., invalidity tables) to increase the number of changes that occur after the table has been loaded to the volatile memory device from a non-volatile memory device. Such techniques may reduce the quantity of transfers of the table between the volatile memory device and a non-volatile memory device and thereby reduce the latency for performing the group of unmap commands. The boost procedure may be a procedure different from a default procedure for performing the set of unmap commands that may, as described herein, reduce latency and power consumption and increase memory system performance associated with performing unmap commands.

Features of the disclosure are initially described in the context of systems as described with reference to FIG. 1.

Features of the disclosure are described in the context process flows as described with reference to FIGS. 2-3. These and other features of the disclosure are further illustrated by and described with reference to an apparatus diagram and a flowchart that relate to unmap operation techniques as described with reference to FIGS. 4-5.

FIG. 1 is an example of a system 100 that supports unmap operation techniques in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a peripheral component interconnect express (PCIe) interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

Memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, where memory system 110 includes more than one memory device 130, different memory devices 130 within memory system 110 may include the same or different types of memory cells.

The memory system controller 115 may be coupled with and communicate with the host system 105 (e.g., via the physical host interface), and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130, and other such operations, which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. And in some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include random access memory (RAM) such as static RAM (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and may be available within the local memory 120 for subsequent retrieval for or manipulation (e.g., updating) by the host system 105 (e.g., with reduced latency relative to a memory device 130) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive RAM (RRAM), oxide based RRAM (OxRAM), and electrically erasable programmable ROM (EEPROM). Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, respectively, which may execute operations on one or more memory cells of the memory device 130. A local controller 135 may operate in conjunction with a memory system controller 115 or may perform one or more functions ascribed herein to the memory system controller 115.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete, and update a logical-to-physical (L2P) mapping table to associate the logical address (e.g., LBA) for the data with the new, valid block 170 rather than the old, invalid block 170. In some cases, such copying and remapping may be used instead of erasing and rewriting the entire old block 170, due to latency or wearout considerations, for example. In some cases, one or more copies of an L2P mapping table may be stored within the memory cells of the memory device 130 (e.g., within or more blocks 170 or planes 165) for use (e.g., reference and updating) by the local controller 135 or memory system controller 115.

In some cases, L2P tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for some or all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the number of blocks 170 that have been erased may be increased such that more blocks 170 are available to store subsequent data (e.g., data subsequently received from the host system 105).

The host system 105 may transmit (e.g., via the host system controller 106) a set of unmap commands to the memory system 110 (e.g., to the memory system controller 115) to free storage space of a memory device 130 that is allocated to or used to store unused data. The memory system 110 (e.g., the memory system controller 115) may determine one or more parameters associated with the set of unmap commands (e.g., a queue depth, a pattern of data, a progressive order of the LBAs, a quantity of unmap commands, or some other parameter) and may select a procedure for performing the set of unmap commands based on the one or more parameters. For example, if the one or more parameters satisfy an associated threshold, the memory system 110 may select a boost procedure for performing the set of unmap commands and may perform the set of unmap commands using the boost procedure. The boost procedure may be a procedure different from a default procedure for performing the set of unmap commands that may, as described herein, reduce latency and power consumption and increase memory system performance associated with performing unmap commands.

The system 100 may include any quantity of non-transitory computer readable media that support unmap operation techniques. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, e.g., one or more memory arrays and related circuitry combined with a local (e.g., on-die or in-package) controller (e.g., local controller 135). An example of a managed memory system may be an MNAND system.

Figure 2:
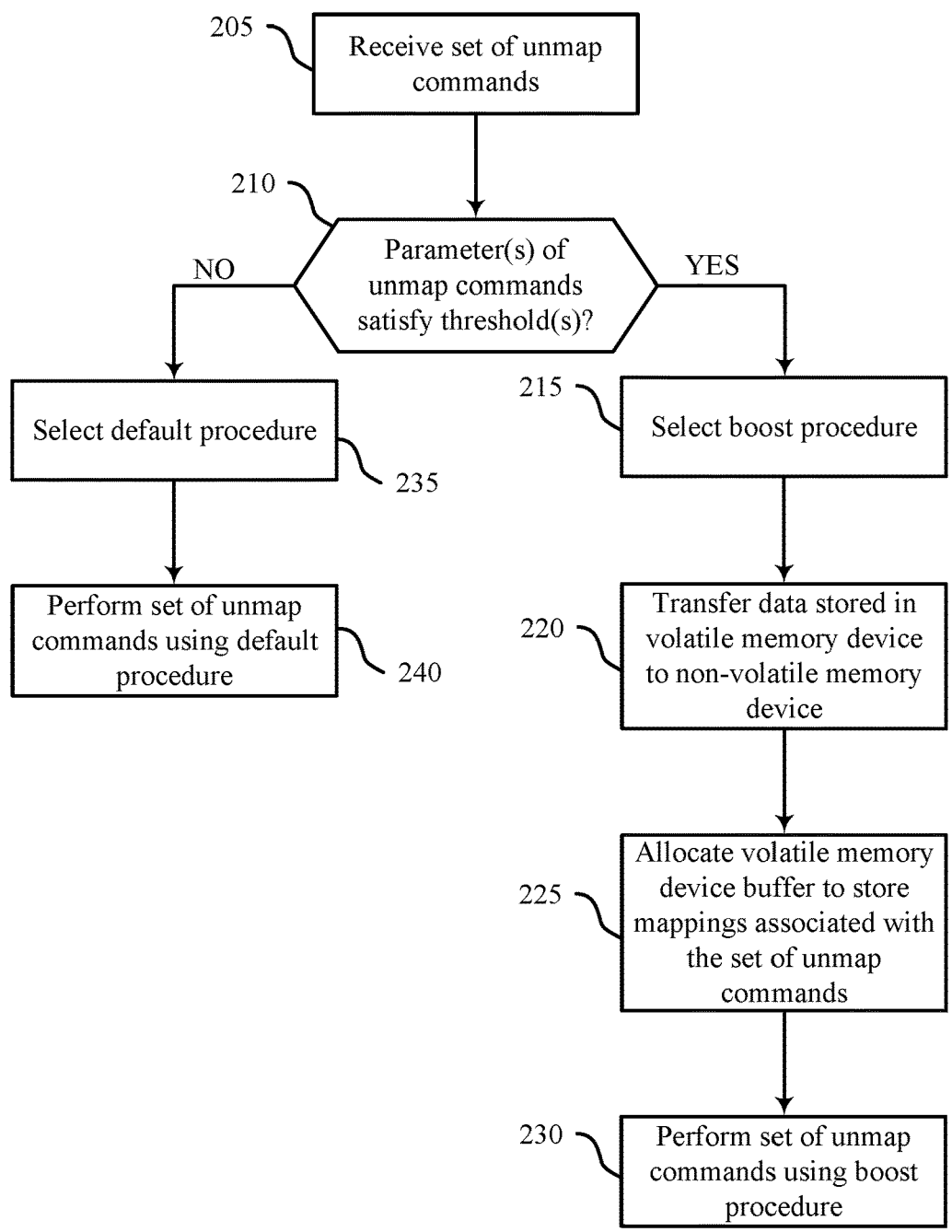
FIG. 2 illustrates an example of a process flow that supports unmap operation techniques in accordance with examples as disclosed herein.

FIG. 2 illustrates an example of a process flow 200 that supports unmap operation techniques in accordance with examples as disclosed herein. Process flow 200 may be performed by components of a memory system, such as memory system 110 described with reference to FIG. 1. For example, process flow 200 may be performed by a controller of a memory system or a memory device (or both) such as a memory system controller 115 as described with reference to FIG. 1. Process flow 200 may depict a process for selecting a procedure for performing unmap commands and performing unmap commands using the selected procedure that may be implemented to reduce latency and power consumption and increase system performance, among other benefits. Aspects of the process flow 200 may be implemented by a controller, among other components. Additionally or alternatively, aspects of the process flow 200 may be implemented as instructions stored in memory (e.g., firmware stored in a memory coupled with the memory system controller 115). For example, the instructions, if executed by a controller (e.g., a memory system controller 115), may cause the controller to perform the operations of the process flow 200.

In the following description of the process flow 200, the operations may be performed in different orders or at different times. Some operations may also be omitted from the process flow 200, and other operations may be added to the process flow 200.

At 205, a set of unmap commands may be received. For example, a host system may transmit a set of unmap commands to the controller to make storage space of a memory device available for other uses. For example, the memory device may be unaware that some data (e.g., host data) stored in the memory device is unused or will not be used again by the host system. To indicate to the memory device that data is unused, the host system may transmit one or more unmap commands to the controller that each include an LBA associated with unused data.

At 210, one or more parameters associated with the set of unmap commands may be evaluated as to whether the one or more parameters satisfy associated one or more thresholds. Examples of the one or more parameters associated with the set of unmap commands may include a queue depth of the set of unmap commands, a pattern of data associated with the set of unmap commands, an order of the LBAs included in the set of unmap commands, and a quantity of unmap commands, among other parameters, or a combination thereof. The controller may determine whether the one or more parameters satisfy associated one or more thresholds. For example, the controller may determine whether a queue depth of the set of unmap commands satisfies a depth threshold (e.g., a queue depth of 4 unmap commands, or some other queue depth), whether the set of unmap commands are issued according to a pattern of data, whether the set of unmap commands are issued in a progressive order of LBAs, whether a quantity of unmap commands of the set of unmap commands satisfies a quantity threshold, or a combination thereof. In some examples, a set of unmap commands issued according to a pattern of data may be a set of unmap commands in which data associated with the LBAs of the unmap commands corresponds to a pattern (e.g., a traffic pattern, a predefined pattern, or some other pattern). In some examples, a set of unmap commands issued in a progressive order of LBAs may be a set of unmap commands in which an LBA of an unmap command subsequent to a previous unmap command is greater than an LBA of the previous unmap command.

In some cases, the one or more parameters satisfying the associated one or more thresholds may indicate to a controller to use a boost procedure for performing the set of unmap commands. For example, in some cases, the host system may issue a large quantity of unmap commands to the controller within a limited duration of time. For example, some host systems (e.g., android devices) may periodically perform one or more defragmentation operations (e.g., at night, while a battery is charging, or at some other time) to consolidate unused pages of data. To perform a defragmentation operation, the host system may issue a large quantity of unmap commands to free pages associated with unused data. However, performing a large quantity of unmap commands (e.g., successively) may increase latency and power consumption at a memory system that includes the controller if using some conventional or default procedures to perform the unmap commands. Therefore, in some examples, the controller may select a boost procedure to use to perform the unmap commands to reduce latency and power consumption and increase memory system performance associated with performing the unmap commands, among other benefits.

For example, if the controller determines that the one or more parameters satisfy the associated one or more thresholds, the controller or memory device (or both) may perform 215 through 230 as follows. For example, if the controller determines that the queue depth of the set of unmap commands is greater than (e.g., or equal to) the depth threshold, the set of unmap commands are issued according to a traffic pattern, the set of unmap commands are issued in a progressive order of LBAs, the quantity of unmap commands of the set of unmap commands is greater than (e.g., or equal to) the quantity threshold, or a combination thereof, the controller or the memory device (or both) may perform 215 through 230, as follows.

At 215, the boost procedure may be selected. For example, the controller may select the boost procedure to perform the set of unmap commands based on determining that the one or more parameters satisfy the associated one or more thresholds.

At 220, data stored in a volatile memory device (e.g., local memory 120, a memory device 130 that includes volatile memory cells, an SRAM device) coupled with the controller may be transferred to a non-volatile memory device (e.g., a memory device 130 that includes non-volatile memory cells, a NAND device) coupled with the controller. For example, the volatile memory device may be associated with faster operations relative to the non-volatile memory device. In some examples, prior to performing the set of unmap commands, the controller may transfer data (e.g., cached data, cached tables, or other data stored in the volatile memory device) from the volatile memory device to the non-volatile memory device. In this way, memory in the volatile memory device may be made available for storing information associated with the set of unmap commands.

At 225, a buffer of the volatile memory device may be allocated to store mappings associated with the set of unmap commands. For example, to perform an unmap command, the controller may at least update an entry of a first mapping that indicates relationships between logical addresses and physical addresses and an entry of a second mapping that indicates the validity of data stored at a physical address, among other operations. The controller may allocate the buffer to store a portion of the first mapping and a portion of the second mapping. In some examples, a portion of the buffer allocated for storing the second mapping may be greater than a portion of the buffer allocated for storing the first mapping.

At 230, the set of unmap commands may be performed using the boost procedure. For example, the controller may use the boost procedure to perform the set of unmap commands. Aspects of performing the set of unmap commands using the boost procedure are described with reference to FIG. 3 below.

If, at 210, the controller determines that the one or more parameters do not satisfy associated thresholds, the controller or memory device (or both) may perform 235 through 240 as follows. For example, if the controller determines that the queue depth of the set of unmap commands is less than (e.g., or equal to) the depth threshold, the set of unmap commands are not issued according to a traffic pattern, the set of unmap commands are not issued in a progressive order of LBAs, the quantity of unmap commands of the set of unmap commands is less than (e.g., or equal to) the quantity threshold or a combination thereof, the controller or the memory device (or both) may perform 235 through 240, as follows.

At 235, a default procedure may be selected. For example, the controller may select the default procedure to perform the set of unmap commands based on determining that the one or more parameters do not satisfy the associated thresholds. In some cases, the default procedure may be any procedure used to perform the set of unmap commands other than the boost procedure.

At 240, the controller or the memory device (or both) may perform the set of unmap commands using the default procedure. In some examples, performing unmap commands using the default procedure may include transferring a portion of the first mapping and a portion of the second mapping from the non-volatile device to the volatile memory device, updating entries of the first mapping and the second mapping, and subsequently transferring the portion of the first mapping and the portion of the second mapping back to the non-volatile memory device. That is, for each unmap command, the default procedure may include transferring portions of the first mapping and the second mapping to and from the volatile memory device.

Figure 3:
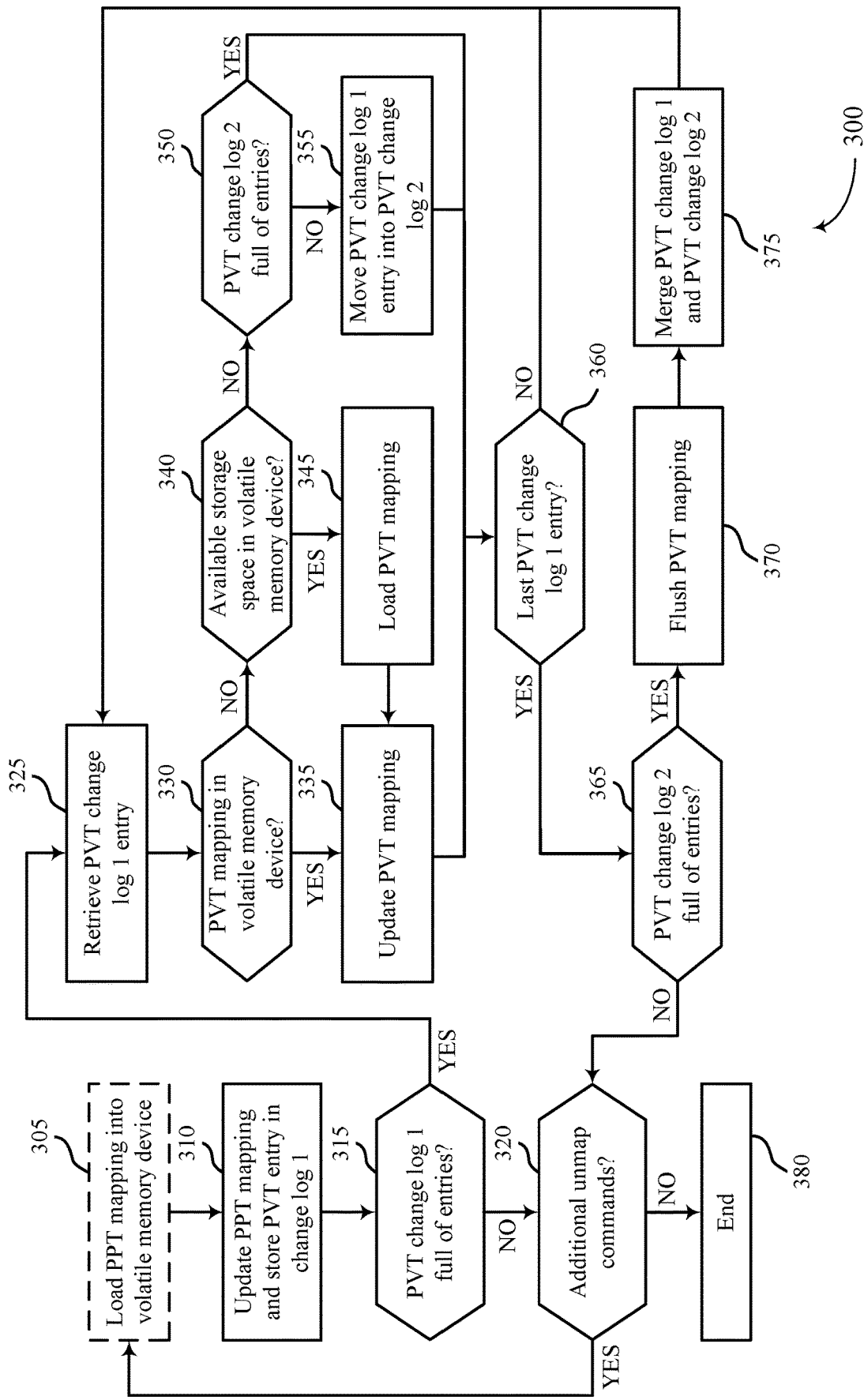
FIG. 3 illustrates an example of a process flow that supports unmap operation techniques in accordance with examples as disclosed herein.

FIG. 3 illustrates an example of a process flow 300 that supports unmap operation techniques in accordance with examples as disclosed herein. Process flow 300 may be performed by components of a memory system, such as memory system 110 described with reference to FIG. 1. For example, process flow 300 may be performed by a controller of a memory system or a memory device (or both) such as a memory system controller 115 as described with reference to FIG. 1. Process flow 300 may depict a process for performing unmap commands using a boost procedure that may be implemented to reduce latency and power consumption and increase system performance, among other benefits. For example, process flow 300 may be an example of how to perform the set of unmap commands using the boost procedure at 230 described with reference to FIG. 2. Aspects of the process flow 300 may be implemented by a controller, among other components. Additionally or alternatively, aspects of the process flow 300 may be implemented as instructions stored in memory (e.g., firmware stored in a memory coupled with the memory system controller 115). For example, the instructions, if executed by a controller (e.g., a memory system controller 115), may cause the controller to perform the operations of the process flow 300.

In some examples, to perform an unmap command, the controller may at least update an entry of a first mapping that indicates relationships between logical addresses and physical addresses and may update an entry of a second mapping that indicates the validity of data stored at a physical address, among other operations. In some examples, the first mapping may be an example a physical pointer table (PPT) that maps logical addresses (e.g., LBAs) to corresponding physical addresses of a non-volatile memory device (e.g., a memory device 130, a NAND device, or some other non-volatile memory device) coupled with the controller. In some cases, the PPT table may be referred to as a logical-to-physical (L2P) table. In some examples, the second mapping may be an example of a page validity table (PVT) that indicates whether data stored at physical addresses is valid. For clarity, process flow 300 uses the specific example of PPT mappings and PVT mappings, but similar processes apply to other mappings, which are also covered under the scope of the disclosure.

In the following description of the process flow 300, the operations may be performed in different orders or at different times. Some operations may also be omitted from the process flow 300, and other operations may be added to the process flow 300.

At 305, a portion of a PPT mapping may optionally be loaded into a volatile memory device (e.g., local memory 120, an SRAM device) coupled with or included in the controller. For example, to begin performing an unmap command of a set of unmap commands, the controller may determine if a portion of the PPT mapping that includes an LBA of the unmap command is stored in the volatile memory device. If the portion of the PPT mapping that includes the LBA is stored in the volatile memory device, the controller may proceed to 310 without loading any additional portions of the PPT mapping. If the portion of the PPT mapping that includes the LBA is not stored in the volatile memory device, the controller may transfer at least the portion of the PPT mapping that includes the LBA from the non-volatile memory device to the volatile memory device. In some examples, if LBAs associated with the set of unmap commands are incremental, or progressive, or both, a single portion of the PPT mapping may include multiple LBAs associated with the set of unmap commands. As a result, the controller may perform operations (e.g., update operations) of multiple unmap commands of the set of unmap commands without loading additional portions of the PPT mapping. Thus, the controller may reduce latency and power consumption associated with performing the set of unmap commands by reducing a number of times that portions of the PPT mapping are transferred to the volatile memory device.

In some cases, the volatile memory device may be associated with faster operations relative to the non-volatile memory device, but the non-volatile memory device may be associated with larger storage capacity relative to the volatile memory device. In some examples, the PPT mapping and the PVT mapping may accordingly be stored in the non-volatile memory device to conserve storage space in the volatile memory device or due to storage restrictions of the volatile memory device, or both. For example, the volatile memory device may not have the storage capacity to store the PPT mapping, or the PVT mapping, or both. Accordingly, the controller may transfer portions of the PPT mapping and the PVT mapping to the volatile memory device to perform operations (e.g., update operations) on the corresponding PPT mapping and PVT mapping portions. Thus, at 305, a portion of the PPT mapping may optionally be loaded into the volatile memory device.

At 310, the portion of the PPT mapping may be updated. For example, the portion of the PPT mapping may include entries that each map an LBA to a physical address of the non-volatile memory device. The unmap command may indicate that the data associated with the LBA of the unmap command is unused. Thus, based on the unmap command, the controller may update an entry of the portion of the PPT mapping corresponding to the LBA of the unmap command to indicate that the LBA is disassociated from the physical address of the unused data.

Additionally at 310, an entry may be stored in a first PVT change log, hereafter referred to as PVT change log 1. For example, an entry of a PVT change log may indicate an update to a corresponding entry of the PVT mapping. An entry of the PVT mapping may indicate whether data stored at a physical address is valid. Here, based on the unmap command, the controller may store an entry in PVT change log 1 that indicates that an entry of the PVT mapping corresponding to the LBA of the unmap command is to be updated to indicate that the data stored at the physical address is invalid.

At 315, the controller may determine whether the PVT change log 1 is full entries. If the PVT change log 1 is full of entries, the controller may proceed to perform 325 through 380, as follows. Performing 315 through 380 may reduce the number of times that the controller transfers portions of the PVT mapping between the volatile memory device and the non-volatile memory device. For example, performing 315 through 380 may group changes to portions of the PVT mapping to increase the number of changes that occur after a portion of the PVT mapping has been transferred to the volatile memory device. This may reduce the number of transfers of portions of the PVT mapping between the volatile memory device and the non-volatile memory device thereby reducing the latency and power consumption for performing the set of unmap commands.

If the PVT change log 1 is not full of entries, at 320, the controller may determine whether there are additional unmap commands of the set of unmap commands to be performed. If there are additional unmap commands to be performed, the controller may perform 305 through 315 until either the PVT change log 1 is full of entries, or there are no additional unmap commands to be performed. If, at 320, there are no additional unmap commands, but there are entries stored in the PVT change log 1, the controller may proceed to perform 325 through 380 using the entries stored PVT change log 1 (e.g., even if PVT change log 1 is not full of entries.

At 325, an entry of the PVT change log 1 may be retrieved. For example, the controller may retrieve an entry stored in the PVT change log 1 to update a corresponding entry of the PVT mapping.

At 330, the controller may determine whether a first portion of the PVT mapping that includes the entry corresponding to the retrieved entry of the PVT change log 1 is stored in the volatile memory device. For example, the volatile memory device may store one or more portions of the PVT mapping instead of the entire PVT mapping (e.g., due to storage capacity restrictions of the volatile memory device). Thus, at 330, the controller may determine if the volatile memory device stores the first portion of the PVT mapping.

If the volatile memory device stores the first portion of the PVT mapping, at 335, the first portion of the PVT mapping may be updated. For example, the controller may update the entry of the PVT mapping corresponding to the retrieved entry of the PVT change log 1 to indicate that the data stored at the physical address is invalid.

If the volatile memory device does not store the first portion of the PVT mapping, at 340, the controller may determine whether there is storage space available in the volatile memory device to store the first portion of the PVT mapping.

If the volatile memory device has the available storage space, at 345, the first portion of the PVT mapping may be loaded into the volatile memory device. For example, the controller may transfer the first portion of the PVT mapping from the non-volatile memory device to the volatile memory device. The controller may then update the entry of the PVT mapping corresponding to the retrieved entry of the PVT change log 1 to indicate that the data stored at the physical address is invalid.

If the volatile memory device does not have the available storage space, at 350, the controller may determine whether a second PVT change log (hereafter referred to as PVT change log 2) is full of entries.

If the PVT change log 2 is available to store additional entries (e.g., is not full of entries), the retrieved entry of the PVT change log 1 may be moved to the PVT change log 2. For example, the controller may move the retrieved entry of the PVT change log 1 to the PVT change log 2.

After updating the first portion of the PVT mapping, or after moving the retrieved entry of the PVT change log 1 to the PVT change log 2, or if the controller determines that the PVT change log 2 is full of entries, at 360, the controller may determine whether the retrieved entry of the PVT change log 1 is a last entry stored in the PVT change log 1.

If there are additional entries of the PVT change log 1 to be performed (e.g., if the retrieved entry of the PVT change log 1 is not the last entry of the PVT change log 1), the controller may retrieve a next entry of the PVT change log 1 and perform 330 through 360 as described above.

If the retrieved entry of the PVT change log 1 is the last entry of the PVT change log 1, at 365, the controller may determine whether the PVT change log 2 is full of entries.

If the controller determines that the PVT change log 2 is full of entries, the controller may perform 370 through 375. For example, at 370, any portions of the PVT mapping stored in the volatile memory device may be flushed. For example, the controller may transfer any portions of the PVT mapping stored in the volatile memory device to the non-volatile memory device.

At 375, the PVT change log 1 and the PVT change log 2 may be merged. For example, the controller may delete any entries of the PVT change log 1 where a corresponding entry of the PVT mapping was updated. The controller may store the entries of the PVT change log 2 in the PVT change log 1 and delete the entries of the PVT change log 2. The controller may subsequently retrieve an entry of the merged PVT change log 1 and perform 330 through 365 as described above.

If the controller determines that the PVT change log 2 is not full of entries, the controller may determine whether there are additional unmap commands of the set of unmap commands to be performed. If there are additional unmap commands to be performed, the controller may perform 305 through 375 as described above. If there are no additional unmap commands to be performed, but there are entries stored in the PVT change log 2, the controller may perform 325 through 375 as described above using the entries stored in the PVT change log 2.

If there are no entries stored in the PVT change log 1 and the PVT change log 2 and there are no additional unmap commands to be performed, at 380, the controller may end the boost procedure.

By using the boost procedure described herein, the controller may reduce the number of times that the controller transfers portions of the PPT mapping and the PVT mapping between the volatile memory device and the non-volatile memory device. For example, in some cases, the controller may refrain from transferring portions of the PPT mapping between the volatile memory device and the non-volatile memory device if an LBA of a subsequent unmap command is included in a portion of the PPT mapping currently stored in the volatile memory device. Additionally or alternatively, the controller may refrain from transferring portions of the PVT mapping until one or more PVT change logs are full of entries. As a result, the controller may update all entries of a portion of a PVT mapping stored in volatile memory device indicated by a PVT change log before transferring the portion of the PVT mapping to the non-volatile memory device. This may reduce latency and power consumption and increase memory system performance associated with performing unmap commands compared to performing unmap commands using a default procedure.

Figure 4:
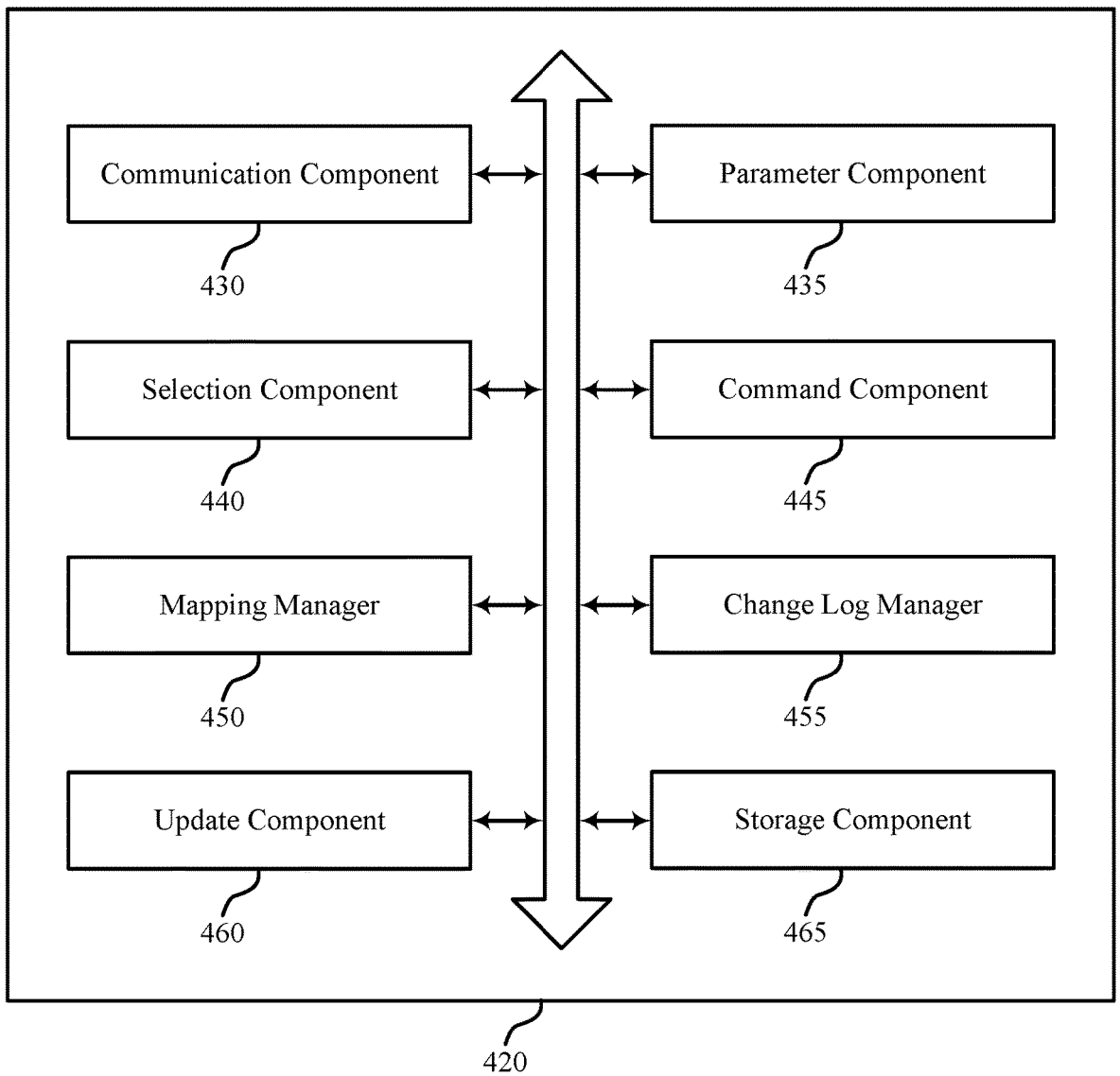
FIG. 4 shows a block diagram of a memory system that supports unmap operation techniques in accordance with examples as disclosed herein.

FIG. 4 shows a block diagram 400 of a memory system 420 that supports unmap operation techniques in accordance with examples as disclosed herein. The memory system 420 may be an example of aspects of a memory system as described with reference to FIGS. 1 through 3. The memory system 420, or various components thereof, may be an example of means for performing various aspects of unmap operation techniques as described herein. For example, the memory system 420 may include a communication component 430, a parameter component 435, a selection component 440, a command component 445, a mapping manager 450, a change log manager 455, an update component 460, a storage component 465, or any combination thereof. Each of these components may communicate, directly or indirectly, with one another (e.g., via one or more buses).

The communication component 430 may be configured as or otherwise support a means for receiving a plurality of unmap commands, each unmap command of the plurality of unmap commands including an LBA associated with unused data. The parameter component 435 may be configured as or otherwise support a means for determining whether one or more parameters associated with the plurality of unmap commands satisfy a threshold. The selection component 440 may be configured as or otherwise support a means for selecting a first procedure for performing the plurality of unmap commands different from a second procedure for performing the plurality of unmap commands based at least in part on determining that the one or more parameters satisfy the threshold. The command component 445 may be configured as or otherwise support a means for performing the plurality of unmap commands using the first procedure.

In some examples, to support determining that the one or more parameters satisfy the threshold, the parameter component 435 may be configured as or otherwise support a means for determining that a queue depth of the plurality of unmap commands satisfies a depth threshold. In some examples, to support determining that the one or more parameters satisfy the threshold, the parameter component 435 may be configured as or otherwise support a means for determining that the plurality of unmap commands are issued according to a pattern of data.

In some examples, to support performing the plurality of unmap commands using the first procedure, the mapping manager 450 may be configured as or otherwise support a means for transferring, from a non-volatile memory device of the memory system to a volatile memory device of the memory system, a portion of a first mapping that indicates relationships between logical addresses and physical addresses, the portion of the first mapping including a first LBA of a first unmap command of the plurality of unmap commands.

In some examples, the mapping manager 450 may be configured as or otherwise support a means for updating a first entry of the first mapping that is associated with the first LBA to indicate that the first LBA is disassociated from a first physical address. In some examples, the change log manager 455 may be configured as or otherwise support a means for storing, based at least part on the first unmap command, an entry in a change log that indicates an update to a first entry of a second mapping that indicates whether data stored at physical addresses is valid, the first entry of the second mapping associated with the first physical address associated with the first unmap command.

In some examples, the change log manager 455 may be configured as or otherwise support a means for determining whether the change log is full of entries based at least in part on storing the entry in the change log.

In some examples, the mapping manager 450 may be configured as or otherwise support a means for determining that a first portion of the second mapping that includes the first entry of the second mapping is stored in the volatile memory device based at least in part on determining that the change log is full. In some examples, the update component 460 may be configured as or otherwise support a means for updating the first entry of the second mapping to indicate that the first physical address associated with the first unmap command stores invalid data based at least in part on the entry stored in the change log and determining that the first portion of the second mapping is stored in the volatile memory device.

In some examples, the mapping manager 450 may be configured as or otherwise support a means for determining that a first portion of the second mapping that includes the first entry of the second mapping is not stored in the volatile memory device based at least in part on determining that the change log is full. In some examples, the storage component 465 may be configured as or otherwise support a means for determine that the volatile memory device has available storage space to store the first portion of the second mapping based at least in part on determining that the first portion of the second mapping is not stored in the volatile memory device. In some examples, the mapping manager 450 may be configured as or otherwise support a means for transferring the first portion of the second mapping to the volatile memory device based at least in part on determining that the volatile memory device has the available storage space to store the first portion of the second mapping. In some examples, the update component 460 may be configured as or otherwise support a means for updating the first entry of the second mapping to indicate that the first physical address associated with the first unmap command stores invalid data based at least in part on the entry stored in the change log and transferring the first portion of the second mapping to the volatile memory device.

In some examples, the change log manager 455 may be configured as or otherwise support a means for determining that a second change log stored in the volatile memory device is available to store additional entries based at least in part on determining that the change log is full of entries. In some examples, the change log manager 455 may be configured as or otherwise support a means for storing an entry in the second change log that indicates the update to the first entry of the second mapping based at least in part on determining that the second change log is available to store additional entries.

In some examples, the change log manager 455 may be configured as or otherwise support a means for determining that a second change log stored in the volatile memory device is full of entries based at least in part on determining that the change log is full of entries. In some examples, the mapping manager 450 may be configured as or otherwise support a means for transferring, to the non-volatile memory device, one or more portions of the second mapping stored in the volatile memory device based at least in part on determining that the second change log is full of entries. In some examples, the change log manager 455 may be configured as or otherwise support a means for merging the change log and the second change log based at least in part on determining that the second change log is full of entries.

In some examples, the change log manager 455 may be configured as or otherwise support a means for determining that the entry stored in the change log is a last entry stored in the change log. In some examples, the command component 445 may be configured as or otherwise support a means for determining that one or more unmap commands of the plurality of unmap commands are waiting to be performed based at least in part on determining that the entry stored in the change log is the last entry stored in the change log. In some examples, the mapping manager 450 may be configured as or otherwise support a means for transferring, to the volatile memory device, a second portion of the first mapping based at least in part on determining that the one or more unmap commands of the plurality of unmap commands have not been performed.

In some examples, the change log manager 455 may be configured as or otherwise support a means for determining that the change log includes additional entries to be performed. In some examples, the update component 460 may be configured as or otherwise support a means for retrieving a second entry stored in the change log to update the second mapping based at least in part on determining that the change log includes additional entries to be performed.

In some examples, the mapping manager 450 may be configured as or otherwise support a means for transferring data stored in the volatile memory device to the non-volatile memory device prior to using the first procedure to perform the plurality of unmap commands based at least in part on selecting the first procedure. In some examples, the mapping manager 450 may be configured as or otherwise support a means for allocating a buffer of the volatile memory device to store a portion of a first mapping that indicates relationships between logical addresses and physical addresses and one or more portions of a second mapping that indicates whether data stored at physical addresses is valid.

In some examples, the one or more parameters associated with the plurality of unmap commands include a quantity of unmap commands, a queue depth, a second LBA of a second unmap command of the plurality of unmap commands received after a first unmap command of the plurality of unmap commands is greater than a first LBA of the first unmap command, or a combination thereof.

In some examples, the second procedure is a default procedure for performing the plurality of unmap commands.

Figure 5:
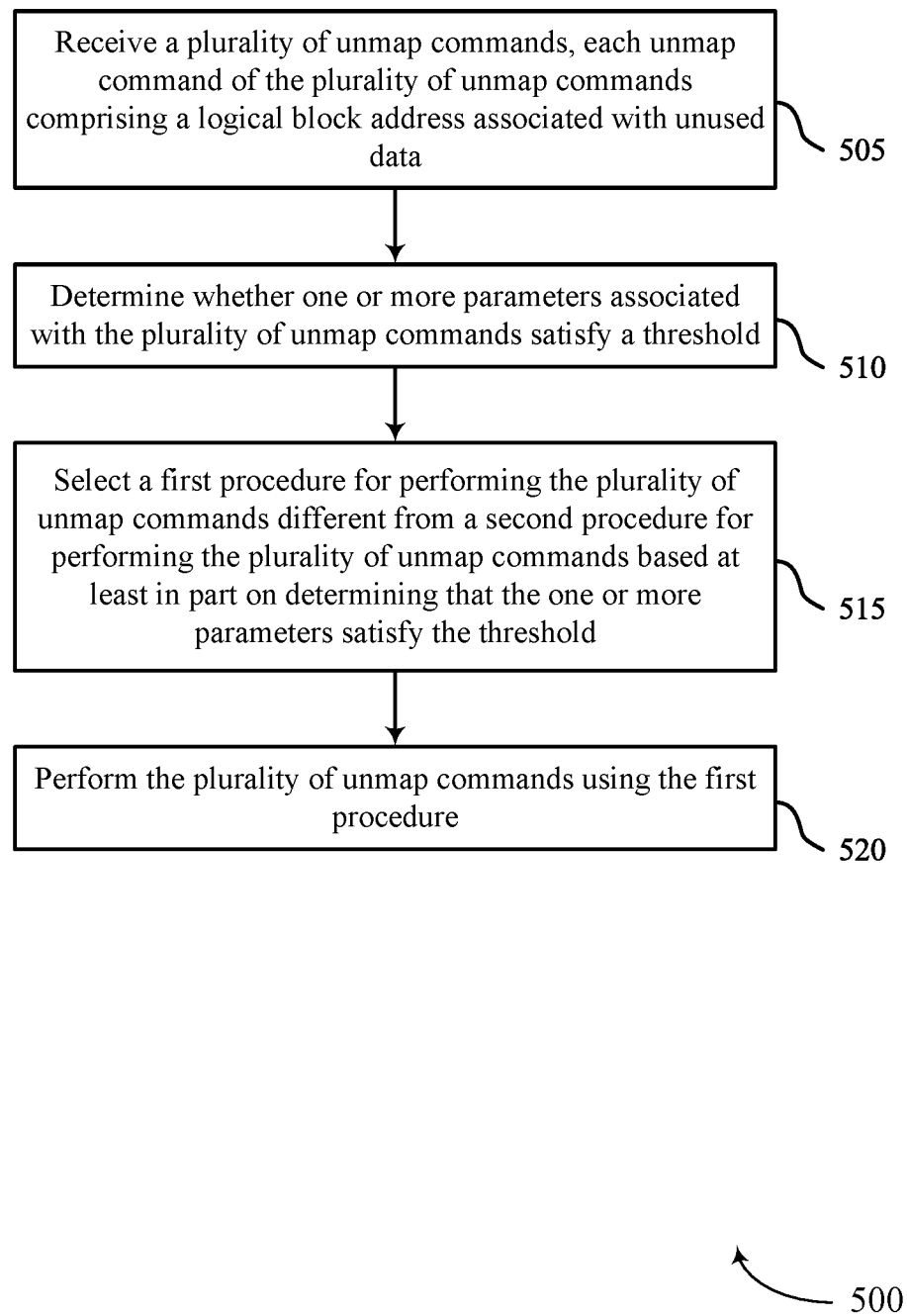
FIG. 5 shows a flowchart illustrating a method or methods that support unmap operation techniques in accordance with examples as disclosed herein.

FIG. 5 shows a flowchart illustrating a method 500 that supports unmap operation techniques in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally or alternatively, the memory system may perform aspects of the described functions using special-purpose hardware.

At 505, the method may include receiving a plurality of unmap commands, each unmap command of the plurality of unmap commands including an LBA associated with unused data. The operations of 505 may be performed in accordance with examples as disclosed herein. In some examples, aspects of the operations of 505 may be performed by a communication component 430 as described with reference to FIG. 4.

At 510, the method may include determining whether one or more parameters associated with the plurality of unmap commands satisfy a threshold. The operations of 510 may be performed in accordance with examples as disclosed herein. In some examples, aspects of the operations of 510 may be performed by a parameter component 435 as described with reference to FIG. 4.

At 515, the method may include selecting a first procedure for performing the plurality of unmap commands different from a second procedure for performing the plurality of unmap commands based at least in part on determining that the one or more parameters satisfy the threshold. The operations of 515 may be performed in accordance with examples as disclosed herein. In some examples, aspects of the operations of 515 may be performed by a selection component 440 as described with reference to FIG. 4.

At 520, the method may include performing the plurality of unmap commands using the first procedure. The operations of 520 may be performed in accordance with examples as disclosed herein. In some examples, aspects of the operations of 520 may be performed by a command component 445 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor) for receiving a plurality of unmap commands, each unmap command of the plurality of unmap commands including an LBA associated with unused data, determining whether one or more parameters associated with the plurality of unmap commands satisfy a threshold, selecting a first procedure for performing the plurality of unmap commands different from a second procedure for performing the plurality of unmap commands based at least in part on determining that the one or more parameters satisfy the threshold, and performing the plurality of unmap commands using the first procedure.

In some examples of the method 500 and the apparatus described herein, determining that the one or more parameters satisfy the threshold may include operations, features, circuitry, logic, means, or instructions for determining that a queue depth of the plurality of unmap commands satisfies a depth threshold and determining that the plurality of unmap commands may be issued according to a pattern of data.

In some examples of the method 500 and the apparatus described herein, performing the plurality of unmap commands using the first procedure may include operations, features, circuitry, logic, means, or instructions for transferring, from a non-volatile memory device of the memory system to a volatile memory device of the memory system, a portion of a first mapping that indicates relationships between logical addresses and physical addresses, the portion of the first mapping including a first LBA of a first unmap command of the plurality of unmap commands.

Some examples of the method 500 and the apparatus described herein may further include operations, features, circuitry, logic, means, or instructions for updating a first entry of the first mapping that may be associated with the first LBA to indicate that the first LBA may be disassociated from a first physical address and storing, based at least part on the first unmap command, an entry in a change log that indicates an update to a first entry of a second mapping that indicates whether data stored at physical addresses may be valid, the first entry of the second mapping associated with the first physical address associated with the first unmap command.

Some examples of the method 500 and the apparatus described herein may further include operations, features, circuitry, logic, means, or instructions for determining whether the change log may be full of entries based at least in part on storing the entry in the change log.

Some examples of the method 500 and the apparatus described herein may further include operations, features, circuitry, logic, means, or instructions for determining that a first portion of the second mapping that includes the first entry of the second mapping may be stored in the volatile memory device based at least in part on determining that the change log may be full and updating the first entry of the second mapping to indicate that the first physical address associated with the first unmap command stores invalid data based at least in part on the entry stored in the change log and determining that the first portion of the second mapping may be stored in the volatile memory device.

Some examples of the method 500 and the apparatus described herein may further include operations, features, circuitry, logic, means, or instructions for determining that a first portion of the second mapping that includes the first entry of the second mapping may be not stored in the volatile memory device based at least in part on determining that the change log may be full, determine that the volatile memory device may have available storage space to store the first portion of the second mapping based at least in part on determining that the first portion of the second mapping may be not stored in the volatile memory device, transferring the first portion of the second mapping to the volatile memory device based at least in part on determining that the volatile memory device may have the available storage space to store the first portion of the second mapping, and updating the first entry of the second mapping to indicate that the first physical address associated with the first unmap command stores invalid data based at least in part on the entry stored in the change log and transferring the first portion of the second mapping to the volatile memory device.

Some examples of the method 500 and the apparatus described herein may further include operations, features, circuitry, logic, means, or instructions for determining that a second change log stored in the volatile memory device may be available to store additional entries based at least in part on determining that the change log may be full of entries and storing an entry in the second change log that indicates the update to the first entry of the second mapping based at least in part on determining that the second change log may be available to store additional entries.

Some examples of the method 500 and the apparatus described herein may further include operations, features, circuitry, logic, means, or instructions for determining that a second change log stored in the volatile memory device may be full of entries based at least in part on determining that the change log may be full of entries, transferring, to the non-volatile memory device, one or more portions of the second mapping stored in the volatile memory device based at least in part on determining that the second change log may be full of entries, and merging the change log and the second change log based at least in part on determining that the second change log may be full of entries.

Some examples of the method 500 and the apparatus described herein may further include operations, features, circuitry, logic, means, or instructions for determining that the entry stored in the change log may be a last entry stored in the change log, determining that one or more unmap commands of the plurality of unmap commands may be waiting to be performed based at least in part on determining that the entry stored in the change log may be the last entry stored in the change log; and, and transferring, to the volatile memory device, a second portion of the first mapping based at least in part on determining that the one or more unmap commands of the plurality of unmap commands may have not been performed.

Some examples of the method 500 and the apparatus described herein may further include operations, features, circuitry, logic, means, or instructions for determining that the change log includes additional entries to be performed and retrieving a second entry stored in the change log to update the second mapping based at least in part on determining that the change log includes additional entries to be performed.

Some examples of the method 500 and the apparatus described herein may further include operations, features, circuitry, logic, means, or instructions for transferring data stored in the volatile memory device to the non-volatile memory device prior to using the first procedure to perform the plurality of unmap commands based at least in part on selecting the first procedure and allocating a buffer of the volatile memory device to store a portion of a first mapping that indicates relationships between logical addresses and physical addresses and one or more portions of a second mapping that indicates whether data stored at physical addresses may be valid.

In some examples of the method 500 and the apparatus described herein, the one or more parameters associated with the plurality of unmap commands include a quantity of unmap commands, a queue depth, a second LBA of a second unmap command of the plurality of unmap commands received after a first unmap command of the plurality of unmap commands may be greater than a first LBA of the first unmap command, or a combination thereof.

In some examples of the method 500 and the apparatus described herein, the second procedure may be a default procedure for performing the plurality of unmap commands.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory system including a volatile memory device and a non-volatile memory device, a controller coupled with the memory system and operable to cause the apparatus to, receive a plurality of unmap commands, each unmap command of the plurality of unmap commands including an LBA associated with unused data, determine whether one or more parameters associated with the plurality of unmap commands satisfy a threshold, select a first procedure for performing the plurality of unmap commands different from a second procedure for performing the plurality of unmap commands based at least in part on determining that the one or more parameters satisfy the threshold, and perform the plurality of unmap commands using the first procedure In some examples of the apparatus, to determine that the one or more parameters satisfy the threshold, the controller may be further configured to cause the apparatus to determine that a queue depth of the plurality of unmap commands satisfies a depth threshold and determine that the plurality of unmap commands may be issued according to a pattern of data.

In some examples of the apparatus, to perform the plurality of unmap commands using the first procedure, the controller may be further configured to cause the apparatus to transfer, from the non-volatile memory device to the volatile memory device, a portion of a first mapping that indicates relationships between logical addresses and physical addresses, the portion of the first mapping including a first LBA of a first unmap command of the plurality of unmap commands.

In some examples of the apparatus, the controller may be further configured to cause the apparatus to update a first entry of the first mapping that may be associated with the first LBA to indicate that the first LBA may be disassociated from a first physical address and store, based at least part on the first unmap command, an entry in a change log that indicates an update to a first entry of a second mapping that indicates whether data stored at physical addresses may be valid, the first entry of the second mapping associated with the first physical address associated with the first unmap command.

In some examples of the apparatus, the controller may be further configured to cause the apparatus to determine whether the change log may be full of entries based at least in part on storing the entry in the change log.

In some examples of the apparatus, the controller may be further configured to cause the apparatus to determine that a first portion of the second mapping that includes the first entry of the second mapping may be stored in the volatile memory device based at least in part on determining that the change log may be full and update the first entry of the second mapping to indicate that the first physical address associated with the first unmap command stores invalid data based at least in part on the entry stored in the change log and determining that the first portion of the second mapping may be stored in the volatile memory device.

In some examples of the apparatus, the controller may be further configured to cause the apparatus to determine that a first portion of the second mapping that includes the first entry of the second mapping may be not stored in the volatile memory device based at least in part on determining that the change log may be full, determine that the volatile memory device may have available storage space to store the first portion of the second mapping based at least in part on determining that the first portion of the second mapping may be not stored in the volatile memory device, transfer the first portion of the second mapping to the volatile memory device based at least in part on determining that the volatile memory device may have the available storage space to store the first portion of the second mapping, and update the first entry of the second mapping to indicate that the first physical address associated with the first unmap command stores invalid data based at least in part on the entry stored in the change log and transferring the first portion of the second mapping to the volatile memory device.

In some examples of the apparatus, the controller may be further configured to cause the apparatus to determine that a second change log stored in the volatile memory device may be available to store additional entries based at least in part on determining that the change log may be full of entries and store an entry in the second change log that indicates the update to the first entry of the second mapping based at least in part on determining that the second change log may be available to store additional entries.

In some examples of the apparatus, the controller may be further configured to cause the apparatus to determine that a second change log stored in the volatile memory device may be full of entries based at least in part on determining that the change log may be full of entries, transfer, to the non-volatile memory device, one or more portions of the second mapping stored in the volatile memory device based at least in part on determining that the second change log may be full of entries, and merge the change log and the second change log based at least in part on determining that the second change log may be full of entries.

In some examples of the apparatus, the controller may be further configured to cause the apparatus to determine that the entry stored in the change log may be a last entry stored in the change log, determine that one or more unmap commands of the plurality of unmap commands may be waiting to be performed based at least in part on determining that the entry stored in the change log may be the last entry stored in the change log, and transfer, to the volatile memory device, a second portion of the first mapping based at least in part on determining that the one or more unmap commands of the plurality of unmap commands may have not been performed.

In some examples of the apparatus, the controller may be further configured to cause the apparatus to determine that the change log includes additional entries to be performed and retrieve a second entry stored in the change log to update the second mapping based at least in part on determining that the change log includes additional entries to be performed.

In some examples of the apparatus, the controller may be further configured to cause the apparatus to transfer data stored in the volatile memory device to the non-volatile memory device prior to using the first procedure to perform the plurality of unmap commands based at least in part on selecting the first procedure and allocate a buffer of the volatile memory device to store a portion of a first mapping that indicates relationships between logical addresses and physical addresses and one or more portions of a second mapping that indicates whether data stored at physical addresses may be valid.

In some examples of the apparatus, the one or more parameters associated with the plurality of unmap commands include a quantity of unmap commands, a queue depth, a second LBA of a second unmap command of the plurality of unmap commands received after a first unmap command of the plurality of unmap commands may be greater than a first LBA of the first unmap command, or a combination thereof.

In some examples of the apparatus, the second procedure may be a default procedure for performing the plurality of unmap commands.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "if," "when," "based on," "based at least in part on," and "in response to," may be used interchangeably. For example, if the terms "if," "when," "based on," "based at least in part on," and "in response to," are used to describe a conditional action or connection between portions of a process, the terms may be used interchangeably.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
a memory system comprising a volatile memory device and a non-volatile memory device; and
a controller coupled with the memory system and operable to cause the apparatus to:
receive a plurality of unmap commands, each unmap command of the plurality of unmap commands comprising a logical block address associated with unused data;
determine whether one or more parameters associated with a set of the plurality of unmap commands satisfy a threshold, wherein the one or more parameters comprise a queue depth corresponding to a quantity of unmap commands of the set of the plurality of unmap commands;
select, based at least in part on the queue depth satisfying a depth threshold, a first procedure for performing the plurality of unmap commands different from a second procedure for performing the plurality of unmap commands based at least in part on determining that the one or more parameters satisfy the threshold; and
perform the plurality of unmap commands using the first procedure.

2. The apparatus of claim 1, wherein, to determine that the one or more parameters satisfy the threshold, the controller is configured to cause the apparatus to:
determine that the plurality of unmap commands are issued according to a pattern of data.

3. The apparatus of claim 1, wherein the one or more parameters associated with the plurality of unmap commands comprise the quantity of the unmap commands, the queue depth, a second logical block address of a second unmap command of the plurality of unmap commands received after a first unmap command of the plurality of unmap commands is greater than a first logical block address of the first unmap command, or a combination thereof.

4. The apparatus of claim 1, wherein, to perform the plurality of unmap commands using the first procedure, the controller is further configured to cause the apparatus to:
transfer, from the non-volatile memory device to the volatile memory device, a portion of a first mapping that indicates relationships between logical addresses and physical addresses, the portion of the first mapping including a first logical block address of a first unmap command of the plurality of unmap commands.

5. The apparatus of claim 4, wherein the controller is further configured to cause the apparatus to:
update a first entry of the first mapping that is associated with the first logical block address to indicate that the first logical block address is disassociated from a first physical address; and
store, based at least part on the first unmap command, an entry in a change log that indicates an update to a first entry of a second mapping that indicates whether data stored at physical addresses is valid, the first entry of the second mapping associated with the first physical address associated with the first unmap command.

6. The apparatus of claim 5, wherein the controller is further configured to cause the apparatus to:
determine whether the change log is full of entries based at least in part on storing the entry in the change log.

7. The apparatus of claim 6, wherein the controller is further configured to cause the apparatus to:
determine that a first portion of the second mapping that comprises the first entry of the second mapping is stored in the volatile memory device based at least in part on determining that the change log is full; and
update the first entry of the second mapping to indicate that the first physical address associated with the first unmap command stores invalid data based at least in part on the entry stored in the change log and determining that the first portion of the second mapping is stored in the volatile memory device.

8. The apparatus of claim 6, wherein the controller is further configured to cause the apparatus to:
determine that a first portion of the second mapping that comprises the first entry of the second mapping is not stored in the volatile memory device based at least in part on determining that the change log is full;
determine that the volatile memory device has available storage space to store the first portion of the second mapping based at least in part on determining that the first portion of the second mapping is not stored in the volatile memory device;
transfer the first portion of the second mapping to the volatile memory device based at least in part on determining that the volatile memory device has the available storage space to store the first portion of the second mapping; and
update the first entry of the second mapping to indicate that the first physical address associated with the first unmap command stores invalid data based at least in part on the entry stored in the change log and transferring the first portion of the second mapping to the volatile memory device.

9. The apparatus of claim 6, wherein the controller is further configured to cause the apparatus to:
determine that a second change log stored in the volatile memory device is available to store additional entries based at least in part on determining that the change log is full of entries; and
store an entry in the second change log that indicates the update to the first entry of the second mapping based at least in part on determining that the second change log is available to store the additional entries.

10. The apparatus of claim 6, wherein the controller is further configured to cause the apparatus to:
determine that a second change log stored in the volatile memory device is full of entries based at least in part on determining that the change log is full of entries;
transfer, to the non-volatile memory device, one or more portions of the second mapping stored in the volatile memory device based at least in part on determining that the second change log is full of entries; and
merge the change log and the second change log based at least in part on determining that the second change log is full of entries.

11. The apparatus of claim 6, wherein the controller is further configured to cause the apparatus to:
determine that the entry stored in the change log is a last entry stored in the change log;
determine that one or more unmap commands of the plurality of unmap commands are waiting to be performed based at least in part on determining that the entry stored in the change log is the last entry stored in the change log; and transfer, to the volatile memory device, a second portion of the first mapping based at least in part on determining that the one or more unmap commands of the plurality of unmap commands have not been performed.

12. The apparatus of claim 6, wherein the controller is further configured to cause the apparatus to:
determine that the change log includes additional entries to be performed; and
retrieve a second entry stored in the change log to update the second mapping based at least in part on determining that the change log includes the additional entries to be performed.

13. The apparatus of claim 1, wherein the controller is further configured to cause the apparatus to:
transfer data stored in the volatile memory device to the non-volatile memory device prior to using the first procedure to perform the plurality of unmap commands based at least in part on selecting the first procedure; and
allocate a buffer of the volatile memory device to store a portion of a first mapping that indicates relationships between logical addresses and physical addresses and one or more portions of a second mapping that indicates whether data stored at physical addresses is valid.

14. The apparatus of claim 1, wherein the second procedure is a default procedure for performing the plurality of unmap commands.

15. A non-transitory computer-readable medium storing code comprising instructions which, when executed by a processor of an electronic device, cause the electronic device to:
receive a plurality of unmap commands, each unmap command of the plurality of unmap commands comprising a logical block address associated with unused data;
determine whether one or more parameters associated with a set of the plurality of unmap commands satisfy a threshold, wherein the one or more parameters comprise a queue depth corresponding to a quantity of unmap commands of the set of the plurality of unmap commands;
select, based at least in part on the queue depth satisfying a depth threshold, a first procedure for performing the plurality of unmap commands different from a second procedure for performing the plurality of unmap commands based at least in part on determining that the one or more parameters satisfying the threshold; and
perform the plurality of unmap commands using the first procedure.

16. The non-transitory computer-readable medium of claim 15, wherein, to determine that the one or more parameters satisfy the threshold, the instructions, when executed by the processor of the electronic device, cause the electronic device to:
determine that the plurality of unmap commands are issued according to a pattern of data.

17. The non-transitory computer-readable medium of claim 15, wherein, to perform the plurality of unmap commands using the first procedure, the instructions, when executed by the processor of the electronic device, further cause the electronic device to transfer, from a non-volatile memory device to a volatile memory device, a portion of a first mapping that indicates relationships between logical addresses and physical addresses, the portion of the first mapping including a first logical block address of a first unmap command of the plurality of unmap commands.

18. The non-transitory computer-readable medium of claim 17, wherein, the instructions, when executed by the processor of the electronic device, further cause the electronic device to:
update a first entry of the first mapping that is associated with the first logical block address to indicate that the first logical block address is disassociated from a first physical address; and
store, based at least part on the first unmap command, an entry in a change log that indicates an update to a first entry of a second mapping that indicates whether data stored at physical addresses is valid, the first entry of the second mapping associated with the first physical address associated with the first unmap command.

19. The non-transitory computer-readable medium of claim 18, wherein, the instructions, when executed by the processor of the electronic device, further cause the electronic device to determine that the change log is full of entries based at least in part on storing the entry in the change log.

20. The non-transitory computer-readable medium of claim 15, wherein, wherein the one or more parameters associated with the plurality of unmap commands comprise the quantity of the unmap commands, the queue depth, a second logical block address of a second unmap command of the plurality of unmap commands received after a first unmap command of the plurality of unmap commands is greater than a first logical block address of the first unmap command, or a combination thereof.

21. A method performed by a memory system, comprising:
receiving a plurality of unmap commands, each unmap command of the plurality of unmap commands comprising a logical block address associated with unused data;
determining whether one or more parameters associated with a set of the plurality of unmap commands satisfy a threshold, wherein the one or more parameters comprise a queue depth corresponding to a quantity of unmap commands of the set of the plurality of unmap commands;
selecting, based at least in part on the queue depth satisfying a depth threshold, a first procedure for performing the plurality of unmap commands different from a second procedure for performing the plurality of unmap commands based at least in part on determining that the one or more parameters satisfying the threshold; and
performing the plurality of unmap commands using the first procedure.

22. The method of claim 21, wherein determining that the one or more parameters satisfy the threshold comprises:
determining that the plurality of unmap commands are issued according to a pattern of data.

23. The method of claim 21, wherein performing the plurality of unmap commands using the first procedure comprises:
transferring, from a non-volatile memory device of the memory system to a volatile memory device of the memory system, a portion of a first mapping that indicates relationships between logical addresses and physical addresses, the portion of the first mapping including a first logical block address of a first unmap command of the plurality of unmap commands.

24. The method of claim 23, further comprising:
updating a first entry of the first mapping that is associated with the first logical block address to indicate that the first logical block address is disassociated from a first physical address; and
storing, based at least part on the first unmap command, an entry in a change log that indicates an update to a first entry of a second mapping that indicates whether data stored at physical addresses is valid, the first entry of the second mapping associated with the first physical address associated with the first unmap command.

25. The method of claim 21, wherein the one or more parameters associated with the plurality of unmap commands comprise the quantity of the unmap commands, the queue depth, a second logical block address of a second unmap command of the plurality of unmap commands received after a first unmap command of the plurality of unmap commands is greater than a first logical block address of the first unmap command, or a combination thereof.

* * * * *